(12) United States Patent
Park et al.

(10) Patent No.: US 11,322,777 B2
(45) Date of Patent: May 3, 2022

(54) LITHIUM SECONDARY BATTERY

(71) Applicant: LG CHEM, LTD., Seoul (KR)

(72) Inventors: Changhun Park, Daejeon (KR);
Minchul Jang, Daejeon (KR);
Byoungkuk Son, Daejeon (KR);
Eunkyung Park, Daejeon (KR);
Junghun Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/093,342

(22) PCT Filed: Sep. 28, 2017

(86) PCT No.: PCT/KR2017/010783
§ 371 (c)(1),
(2) Date: Oct. 12, 2018

(87) PCT Pub. No.: WO2018/062882
PCT Pub. Date: Apr. 5, 2018

(65) Prior Publication Data
US 2019/0140318 A1 May 9, 2019

(30) Foreign Application Priority Data

Sep. 30, 2016 (KR) .................. 10-2016-0127000
Sep. 27, 2017 (KR) .................. 10-2017-0124872

(51) Int. Cl.
*H01M 10/0565* (2010.01)
*H01M 10/052* (2010.01)
(Continued)

(52) U.S. Cl.
CPC ....... *H01M 10/0565* (2013.01); *H01M 4/382* (2013.01); *H01M 4/405* (2013.01);
(Continued)

(58) Field of Classification Search
CPC .......... H01M 10/0565; H01M 2/1646; H01M 10/0566; H01M 10/052; H01M 10/0569;
(Continued)

(56) References Cited

U.S. PATENT DOCUMENTS 5,538,814 A * 7/1996 Kamauchi .......... H01M 4/5825
429/303
6,482,545 B1 11/2002 Skotheim et al.
(Continued)

FOREIGN PATENT DOCUMENTS

CN 1411092 A 4/2003
CN 105390743 A 3/2016
(Continued)

OTHER PUBLICATIONS

International Search Report (PCT/ISA/210) issued in PCT/KR2017/010783, dated Jan. 24, 2018.
(Continued)

*Primary Examiner* — Cynthia K Walls
(74) *Attorney, Agent, or Firm* — Birch, Stewart, Kolasch & Birch, LLP (57) ABSTRACT

The present invention relates to a lithium secondary battery, and in particular, to a lithium secondary battery including a positive electrode, a negative electrode, and a separator and an electrolyte interposed between the positive electrode and the negative electrode, wherein a gel polymer electrolyte is included between the negative electrode and the separator, and a liquid electrolyte is included between the positive electrode and the separator.

The lithium secondary battery according to the present invention uses a different electrolyte in each of a positive electrode and a negative electrode improving stability and
(Continued)

performance of the electrodes, and as a result, performance and a life time of the lithium secondary battery may be enhanced.

17 Claims, 2 Drawing Sheets

(51) Int. Cl.
| | | |
|---|---|---|
| *H01M 10/0569* | (2010.01) | |
| *H01M 4/40* | (2006.01) | |
| *H01M 4/38* | (2006.01) | |
| *H01M 10/0566* | (2010.01) | |
| *H01M 50/431* | (2021.01) | |
| *H01M 4/02* | (2006.01) | |
| *H01M 4/36* | (2006.01) | |

(52) U.S. Cl.
CPC ..... *H01M 10/052* (2013.01); *H01M 10/0566* (2013.01); *H01M 10/0569* (2013.01); *H01M 50/431* (2021.01); *H01M 4/366* (2013.01); *H01M 2004/027* (2013.01); *H01M 2300/0028* (2013.01); *H01M 2300/0085* (2013.01); *H01M 2300/0091* (2013.01)

(58) Field of Classification Search
CPC ...... H01M 4/405; H01M 4/382; H01M 4/366; H01M 2300/0028; H01M 2004/027; H01M 2300/0085; H01M 2300/0091; H01M 2300/0082; H01M 2300/0025; Y02E 60/122
See application file for complete search history.

(56) References Cited

U.S. PATENT DOCUMENTS

| | | | |
|---|---|---|---|
| 2003/0113636 A1 | 6/2003 | Sano et al. | |
| 2012/0141889 A1* | 6/2012 | Lee .................. | H01M 12/06 429/405 |
| 2013/0224609 A1 | 8/2013 | Lee et al. | |
| 2015/0079480 A1 | 3/2015 | Ahn et al. | |
| 2016/0064770 A1* | 3/2016 | Lee .................. | H01M 4/382 429/303 |
| 2016/0087305 A1 | 3/2016 | Yoneda et al. | |
| 2016/0190641 A1 | 6/2016 | Lee et al. | |
| 2016/0240887 A1 | 8/2016 | Hatta et al. | |
| 2017/0263978 A1 | 9/2017 | Koh et al. | |

FOREIGN PATENT DOCUMENTS

| | | | |
|---|---|---|---|
| CN | 105874642 | A | 8/2016 |
| EP | 3 206 248 | A1 | 8/2017 |
| JP | 9-63646 | A | 3/1997 |
| JP | 2012-146490 | A | 8/2012 |
| JP | 2016-66611 | A | 4/2016 |
| KR | 10-2001-0083043 | A | 8/2001 |
| KR | 10-2001-0092193 | A | 10/2001 |
| KR | 10-2006-0059687 | A | 6/2006 |
| KR | 10-2009-0055224 | A | 6/2009 |
| KR | 10-2013-0099706 | A | 9/2013 |
| KR | 10-1558861 | B1 | 10/2015 |
| KR | 10-2016-0026648 | A | 3/2016 |
| KR | 10-2016-0034183 | A | 3/2016 |
| KR | 10-2016-0051652 | A | 5/2016 |
| KR | 10-2016-0052351 | A | 5/2016 |
| KR | 10-2016-0079574 | A | 7/2016 |
| KR | 10-2016-0102409 | A | 8/2016 |
| WO | WO 2015/097952 | A1 | 7/2015 |

OTHER PUBLICATIONS

European Search Report for Appl. No. 17856768.1 dated Jul. 9, 2019.

* cited by examiner

LITHIUM SECONDARY BATTERY

TECHNICAL FIELD

This application claims the benefits of Korean Patent Application No. 10-2016-0127000, filed on Sep. 30, 2016, with the Korean Intellectual Property Office and Korean Patent Application No. 10-2017-0124872, filed on Sep. 27, 2017, with the Korean Intellectual Property Office, the disclosure of which are herein incorporated by reference in its entirety.

The present invention relates to a lithium secondary battery, and in particular, to a lithium secondary battery designed to increase stability of a lithium metal electrode, and exhibit more superior performance and life time properties.

BACKGROUND ART

With increases in technology developments and demands for mobile devices, demands for secondary batteries as an energy source have rapidly increased. Among the secondary batteries, lithium secondary batteries having high energy density and operating potential, a long cycle life and a low self-discharge rate have been commercialized and widely used.

In addition, as interests in environmental problems have recently increased, extensive studies on electric vehicles (EV), hybrid electric vehicles (HEV) and the like that may replace vehicles using fossil fuel such as gasoline vehicles and diesel vehicles, one of major reasons of air pollution, have been progressed. Nickel hydrogen metal (Ni-MH) secondary batteries are normally used as a power source of the electric vehicles (EV), hybrid electric vehicles (HEV) and the like, however, studies on using lithium secondary batteries having high energy density, high discharge voltage and output stability have been actively progressed and some of these have been commercialized.

A lithium secondary battery has a structure of laminating or winding an electrode assembly including a positive electrode, a negative electrode, and a separator interposed between the positive electrode and the negative electrode, and is formed by embedding the electrode assembly in a battery case, and injecting a non-aqueous electrolyte liquid thereinto. Such a lithium secondary battery is charged and discharged while repeating a process of lithium ions of the positive electrode being intercalated and deintercalated to the negative electrode. Capacity of a lithium secondary battery varies depending on the types of an electrode active material, however, needs for increasing capacity and enhancing stability have consistently arisen.

Accordingly, more lithium ions are capable of being intercalated and deintercalated through an alloying reaction with lithium, and metal-based materials such as silicon (4,200 mAh/g) or tin (990 mAh/g) exhibiting a high capacity property have been used as a negative electrode active material. However, when using metals such as silicon or tin as a negative electrode active material, the volume greatly expands by approximately 4 times in a process of alloying with lithium during charge, and contracts during discharge. With such considerable changes in the electrode volume repeatedly occurring during charge and discharge, the active material is slowly micronized and detached from the electrode causing a rapid capacity decrease, which makes commercialization difficult.

Compared to the negative electrode active material mentioned above, lithium metal has excellent theoretical energy density of 3,860 mAh/g, and has very low standard reduction potential (standard hydrogen electrode; SHE) of −3.045 V facilitating the obtaining of high capacity and high energy density batteries. In addition, with recently increased interests on lithium-sulfur and lithium-air batteries, lithium metal has been actively studied as a negative electrode active material of a lithium secondary battery.

However, when using lithium metal as a negative electrode of a lithium secondary battery, lithium metal reacts with an electrolyte liquid, impurities, a lithium salt and the like to form a passivation layer (solid electrolyte interphase; SEI), and such a passivation layer causes a local difference in the current density facilitating dendritic dendrite formation by the lithium metal during charge, and causes an internal short circuit between the positive electrode and the negative electrode by gradually growing during charge and discharge. In addition, dendrite has a mechanically weak portion (bottleneck), and forms dead lithium which loses an electric contact with a current collector during discharge, thereby reducing battery capacity and shortening a cycle life, and having unfavorable effects on battery stability. Due to such nonuniformity of an oxidation and reduction reaction of the lithium metal negative electrode and reactivity with the electrolyte liquid, a lithium secondary battery using lithium metal as a negative electrode has not been commercialized yet.

In view of the above, various methods such as introducing a polymer protective layer or an inorganic solid protective layer on a lithium metal surface, increasing a lithium salt of an electrolyte liquid, or introducing proper additives have been studied.

As one example, Korean Patent Application Publication No. 2009-0055224 discloses that an electrode surface may be protected from an electrolyte liquid by forming a polyimide protective layer on a lithium electrode surface.

In addition, Korean Patent Application Publication No. 2016-0052351 discloses that lithium dendrite growth is suppressed by including a lithium dendrite absorbing material in a polymer protective layer formed on a lithium metal surface, which may improve stability and life time properties of a lithium secondary battery.

These patents have somewhat stabilized a lithium metal surface, however, the effect is not sufficient. In addition, a protective layer becomes hard during charge and discharge, or degeneration such as swelling occurs when in contact with an electrolyte liquid making the application in lithium secondary batteries difficult. In addition thereto, changing an electrolyte composition or adding a separate protective layer requires considerable time and costs, and is uneconomical. Accordingly, development of a lithium secondary battery capable of enhancing charge and discharge efficiency and life time properties of the lithium secondary battery by improving a problem of lithium metal electrode instability has been much required.

PRIOR ART DOCUMENTS

Patent Documents

Korean Patent Application Publication No. 2009-0055224 (2009 Jun. 2), Lithium metal battery comprising polyimide film and method of producing thereof Korean Patent Application Publication No. 2016-0052351 (2016 May 12), Lithium metal electrode for lithium secondary battery with safe protective layer and lithium secondary battery comprising the same

DISCLOSURE

Technical Problem

As a result of extensive studies in view of the above, the inventors of the present invention have identified that, by introducing a gel polymer electrolyte or a liquid electrolyte including a most efficient organic solvent to a positive electrode and a negative electrode, respectively, efficiency and stability of the positive electrode and the negative electrode are improved, which resultantly enhances battery performance.

Accordingly, an aspect of the present invention provides a lithium secondary battery including a gel polymer electrolyte comprising an ether-based solvent in a negative electrode, and including a liquid electrolyte comprising a carbonate-based solvent in a positive electrode.

Technical Solution

According to an aspect of the present invention, there is provided a lithium secondary battery including a positive electrode, a negative electrode, and a separator and a electrolyte interposed between the positive electrode and the negative electrode, wherein a gel polymer electrolyte is included between the negative electrode and the separator, and a liquid electrolyte is included between the positive electrode and the separator.

The negative electrode comprises a lithium metal or a lithium alloy.

The gel polymer electrolyte comprises a polymer matrix impregnated with an electrolyte solution comprising an ether-based solvent and a lithium salt.

The liquid electrolyte comprises a carbonate-based solvent and a lithium salt.

According to another aspect of the present invention, there is provided a lithium secondary battery including a positive electrode, a negative electrode, and a separator, a gel polymer electrolyte and a liquid electrolyte interposed therebetween, wherein the gel polymer electrolyte comprises an ether-based solvent, and the liquid electrolyte comprises a carbonate-based solvent.

Advantageous Effects

A lithium secondary battery according to the present invention uses a gel polymer electrolyte comprising an ether-based solvent in a negative electrode and uses a liquid electrolyte comprising a carbonate-based solvent in a positive electrode to manufacture the lithium secondary battery, and as a result, a lithium secondary battery capable of satisfying long-term charge and discharge efficiency and cycle properties while having a high output can be provided.

BEST MODE

Hereinafter, the present invention will be described in detail with reference to accompanying drawings. Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Accordingly, drawings described in the present specification and constitutions described in the embodiments are just one most preferred embodiment of the present invention, and do not represent all technological ideas of the present invention, and therefore, it needs to be understood that various equivalents and modification examples that may replace these may be present at the time of application of the present invention.

As the information and communication industry is rapidly developed and applications of lithium secondary batteries expand starting from mobile phones, wireless electronic devices to electric vehicles, demands for the development of lithium secondary batteries that may be smaller, lighter, thinner and portable, and having high performance and high stability have increased.

Responding to such demands, lithium metal batteries (LMB) using lithium metal as a negative electrode have recently received attentions. Lithium metal has high energy density (3,860 mAh/g) while having low oxidation/reduction potential (−3.045 V vs standard hydrogen electrode) and atomic weight (6.94 g/a.u.), and is expected as a negative electrode material of high capacity lithium secondary batteries.

However, when using lithium metal as a negative electrode, the lithium metal reacts with an organic solvent or a lithium salt forming an electrolyte, impurities present in a battery, and the like to produce a passivation layer and the passivation layer causes a local current density difference forming dendritic lithium dendrite. The lithium dendrite causes an battery internal short circuit and dead lithium as well as reducing a life time of a lithium secondary battery, which increases physical and chemical instability of the lithium secondary battery and results in adverse effects on charge and discharge capacity. Furthermore, the passivation layer is thermally unstable and, when a battery is continuously charged and discharged or, particularly, stored at a high temperature in a completely charged state, may slowly collapse by increased electrochemical energy and thermal energy. Due to such collapse of the passivation layer, a side reaction of the exposed lithium metal surface directly reacting with an electrolyte liquid solvent and being decomposed consistently occurs, and as a result, resistance of the negative electrode increases, and charge and discharge efficiency of the battery decreases. In addition, the electrolyte solvent is consumed when forming the passivation layer, and there is a problem in that a battery life time is reduced due to byproducts, gas and the like produced during various side reactions such as the passivation layer formation and collapse, and electrolyte liquid decomposition.

Accordingly, a method such as changing an electrolyte composition, introducing a separate protective layer on a lithium metal surface, or the like has been used in the art, however, stability of a lithium metal electrode has not been effectively improved.

In view of the above, the present invention provides a lithium secondary battery including a most efficient electrolyte in each of a positive electrode and a negative electrode in order to increase stability of the lithium metal electrode and secure effects of improving charge and discharge properties and life time of the lithium secondary battery.

Specifically, a lithium secondary battery according to the present invention comprises a positive electrode, a negative electrode, and a separator and an electrolyte interposed between the positive electrode and the negative electrode, wherein a gel polymer electrolyte is included between the negative electrode and the separator, and a liquid electrolyte is included between the positive electrode and the separator.

Figure 1:
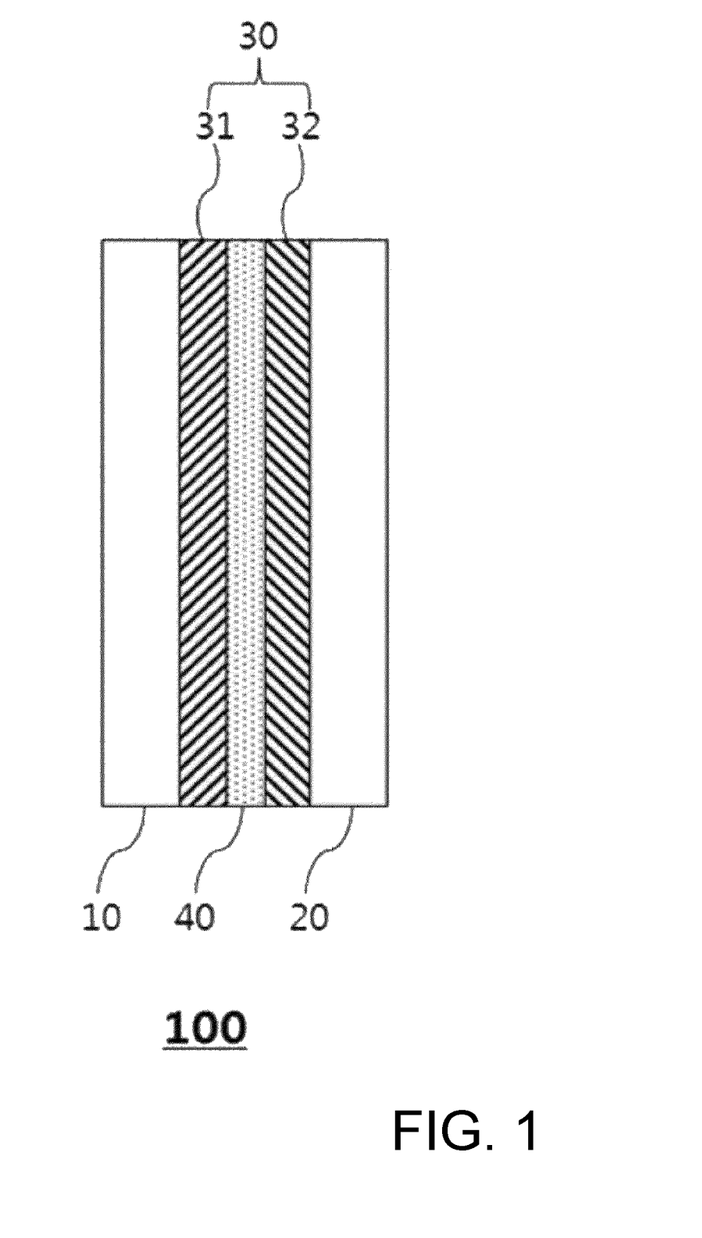
FIG. 1 is a sectional diagram illustrating a lithium secondary battery according to one embodiment of the present invention.

FIG. 1 is a sectional diagram illustrating a lithium secondary battery according to one embodiment of the present invention.

When referring to FIG. 1, the lithium secondary battery (100) according to one embodiment of the present invention comprises a positive electrode (20), a negative electrode (10), and a separator (40) and an electrolyte (30) interposed between the positive electrode (20) and the negative electrode (10), and herein, a gel polymer electrolyte (31) is included between the negative electrode (10) and the separator (40), and a liquid electrolyte (32) is included between the positive electrode (20) and the separator (40).

Electrolytes generally used in a lithium secondary battery include a liquid electrolyte dissolving a lithium salt in an organic solvent, and a gel polymer electrolyte impregnating this liquid electrolyte into a polymer material. The liquid electrolyte has high ion conductivity and is uniformly dispersed, and therefore, is advantageous for high current charge since lithium ions are sufficiently diffused into an electrode, however, due to the organic solvent, a separator, a special protective circuit and the like need to be installed for securing stability. Meanwhile, the gel polymer electrolyte secures superior stability and may be designed to have various shapes since there is no concern of organic solvent outflow and the electrolyte performs a role of a separator at the same time, however, the gel polymer electrolyte has a problem of poor life time property due to low ion conductivity compared to the liquid electrolyte and its nonuniform dispersion property. In addition thereto, the electrolyte exhibits different properties depending on types of electrode active material, types of organic solvent included in an electrolyte, and battery operating conditions.

In view of the above, the present invention introduces an electrolyte comprising a specific organic solvent suitable for an active material used in a negative electrode and a positive electrode of a lithium secondary battery. In other words, when using lithium metal as a negative electrode, a gel polymer electrolyte comprising an ether-based solvent is included in the negative electrode, and a liquid electrolyte comprising a carbonate-based solvent is included in a positive electrode, and as a result, advantages of each electrolyte are maximized, and particularly, reaction efficiency and stability of the lithium metal electrode are enhanced, which provides a lithium secondary battery having improved charge and discharge efficiency and life time property.

The positive electrode (20) may include a positive electrode current collector and a positive electrode active material layer coated on one surface or both surfaces of the positive electrode current collector.

The positive electrode current collector is not particularly limited as long as it supports the positive electrode active material layer and has high conductivity without inducing chemical changes to the corresponding battery. For example, copper, stainless steel, aluminum, nickel, titanium, palladium, baked carbon, copper or stainless steel of which surface is treated with carbon, nickel, silver or the like, aluminum-cadmium alloys and the like may be used.

The positive electrode current collector may strengthen binding strength with a positive electrode active material by forming micro-unevenness on its surface, and various forms such as films, sheets, foil, meshes, nets, porous bodies, foams and non-woven fabrics may be used.

The positive electrode active material layer may include a positive electrode active material, and selectively, a conductive material and a binder.

Examples of the positive electrode active material may include layer compounds such as lithium cobalt oxide (LiCoO$_2$) or lithium nickel oxide (LiNiO$_2$) or compounds substituted with one or more transition metals; lithium manganese oxide such as a chemical formula of Li$_{1+x}$Mn$_{2-x}$O$_4$ (0≤x≤0.33), LiMnO$_3$, LiMn$_2$O$_3$ or LiMnO$_2$; lithium copper oxide (Li$_2$CuO$_2$); vanadium oxide such as LiV$_3$O$_8$, LiFe$_3$O$_4$, V$_2$O$_5$ or Cu$_2$V$_2$O$_7$; Ni site-type lithium nickel oxide represented by a chemical formula of LiNi$_{1-x}$M$_x$O$_2$ (M=Co, Mn, Al, Cu, Fe, Mg, B or Ga; 0.01≤x≤0.3); lithium manganese composite oxide represented by a chemical formula of LiMn$_{2-x}$M$_x$O$_2$ (M=Co, Ni, Fe, Cr, Zn or Ta; 0.01≤x≤0.1) or Li$_2$Mn$_3$MO$_8$ (M=Fe, Co, Ni, Cu or Zn); spinel-structured lithium manganese composite oxide represented by LiNi$_x$Mn$_{2-x}$O$_4$; LiMn$_2$O$_4$ in which some of Li in the chemical formula are substituted with alkaline earth metal ions; disulfide compounds; Fe$_2$(MoO$_4$)$_3$ and the like, but are not limited thereto. Preferably, the positive electrode active material may be one or more types selected from the group consisting of lithium cobalt oxide, lithium nickel oxide and lithium manganese oxide. More preferably, the positive electrode active material may be lithium cobalt oxide.

The conductive material is for enhancing electrical conductivity, and is not particularly limited as long as it is an electron conducting material without inducing chemical changes in a lithium secondary battery.

Generally, carbon black, graphite, carbon fibers, carbon nanotubes, metal powders, conductive metal oxides, organic conductive material or the like may be used, and as products commercially-available as a conductive material, acetylene black series (products of Chevron Chemical Company, Gulf Oil Company or the like), ketjen black EC series (products of Armak Company), Vulcan XC-72 (products of Cabot Company), Super-P (products of MMM) and the like may be included. For example, acetylene black, carbon black, graphite and the like may be included.

In addition, the positive electrode active material layer may further include a binder having functions of maintaining the positive electrode active material on the current collector for a positive electrode, and linking the active materials. As the binder, various types of binders such as, for example, polyvinylidene fluoride-hexafluoropropylene (PVDF-co-HFP), polyvinylidene fluoride (PVDF), polyacrylonitrile, polymethyl methacrylate, styrene-butadiene rubber (SBR) or carboxylmethylcellulose (CMC).

The negative electrode (10) may include a negative electrode current collector and a negative electrode active material layer located on the negative electrode current collector. Alternatively, the negative electrode (10) may be a lithium metal plate.

The negative electrode current collector is for supporting the negative electrode active material layer, and is not particularly limited as long as it has excellent conductivity and is electrochemically stable in a voltage region of a lithium secondary battery. For example, copper, stainless steel, aluminum, nickel, titanium, palladium, baked carbon, copper or stainless steel of which surface is treated with carbon, nickel, silver or the like, aluminum-cadmium alloys and the like may be used.

The negative electrode current collector may strengthen binding strength with a negative electrode active material by forming micro-unevenness on its surface, and various forms such as films, sheets, foil, meshes, nets, porous bodies, foams and non-woven fabrics may be used.

The thickness of the negative electrode current collector is not particularly limited, and may be properly determined depending on the application. For example, the current collector may have a thickness of 3 μm to 500 μm, preferably 5 μm to 100 μm and more preferably 5 μm to 50 μm. When the thickness of the current collector is less than the above-mentioned range, durability decreases, and when the thickness is greater than the above-mentioned range, capacity per volume of a lithium secondary battery may decrease.

The negative electrode active material layer may include materials capable of reversibly intercalating or deintercalating lithium ions, materials capable of reversibly forming a lithium-containing compound by reacting with lithium ions, lithium metal or lithium alloys. The negative electrode active material layer may have a form of a lithium metal thin film or lithium metal powder on the negative electrode current collector.

A method of forming the negative electrode active material layer is not particularly limited, and methods for forming a layer or film commonly used in the art may be used. For example, methods such as compression, coating or deposition may be used. In addition, a case of assembling a battery with no lithium thin film on a current collector and then forming a metal lithium thin film on a metal plate by initial charge is also included in the negative electrode (10) of the present invention.

The negative electrode active material layer or the lithium metal plate may have its width adjusted depending on the form of an electrode so that the electrode is readily prepared. In addition, the thickness of the negative electrode active material layer or the lithium metal plate is not particularly limited as well, but may be, for example, from 5 μm to 200 μm and preferably from 10 μm to 100 μm. When the lithium metal layer thickness is in the above-mentioned range, ions and electrons in the negative electrode may be smoothly transferred.

The separator (40) is for physically separating both electrodes in the lithium secondary battery of the present invention, and is not particularly limited as long as it is commonly used as a separator in a lithium secondary battery, and those having an excellent electrolyte moisture-containing ability while having low resistance for ion migration of the electrolyte are particularly preferred.

The separator (40) may be formed with a porous substrate, and as the porous substrate, porous substrate commonly used in electrochemical devices may all be used. Examples thereof may include polyolefin-based porous membranes or non-woven fabrics, but are not limited thereto.

Examples of the polyolefin-based porous membrane may include membranes formed with a polyolefin-based polymer such as polyethylene including high density polyethylene, linear low density polyethylene, low density polyethylene or ultra-high molecular weight polyethylene, polypropylene, polybutylene and polypentene either alone or formed with a polymer mixing these.

As the non-woven fabric other than polyolefin-based non-woven fabric, non-woven fabrics formed with, for example, polyester such as polyethylene terephthalate, polybutylene terephthalate or polyethylene naphthalate; polyamide such as polyacetal or aramid; polycarbonate; polyimide; polyetheretherketone; polyether sulfone; polyphenylene oxide; polyphenylene sulfide; polytetrafluoroethylene; polyvinylidene fluoride; poly(vinyl chloride); polyacrylonitrile; cellulose; nylon; poly(p-phenylene benzobisoxazole); glass; ceramic; ionically conductive glass-ceramic and the like either alone, or formed by mixing these. The non-woven fabric may have a structure of a spunbond non-woven fabric or a meltblown non-woven fabric formed with long fibers.

The thickness of the porous substrate is not particularly limited, but may be from 1 μm to 100 μm and preferably from 5 μm to 50 μm.

Sizes of the pores present in the porous substrate and porosity are not particularly limited as well, but may be from 0.001 μm to 50 μm and 10% to 95%, respectively.

The electrolyte (30) includes lithium ions, is for producing an electrochemical oxidation or reduction reaction in the positive electrode and the negative electrode through a medium thereof, and may include a gel polymer electrolyte (31) and a liquid electrolyte (32).

The gel polymer electrolyte (31) is included between the negative electrode (10) and the separator (40), and has a form of a polymer matrix impregnated with an electrolyte solution comprising an ether-based solvent and a lithium salt.

The ether-based solvent performs a role of a medium through which ions involving in an electrochemical reaction of a lithium secondary battery may migrate. Particularly, when the lithium secondary battery (100) according to the present invention comprises the ether-based solvent, efficiency with lithium metal used in the negative electrode (10) is high increasing the degree of ion dissociation, and as a result, ion conduction may become smoother.

The ether-based solvent may comprise at least one selected from the group consisting of dimethyl ether, diethyl ether, dibutyl ether, ethylene glycol dimethyl ether, diethylene glycol dimethyl ether, diethylene glycol diethyl ether, triethylene glycol dimethyl ether, triethylene glycol diethyl ether, 1,3-dioxolane, 4-methyldioxolane, 1,4-dioxane, 3,5-dimethyl isoxazole, 2,5-dimethylfuran, furan, 2-methylfuran, tetrahydrofuran and 2-methyltetrahydrofuran. Preferably, the ether-based solvent may be at least one selected from the group consisting of ethylene glycol dimethyl ether, diethylene glycol dimethyl ether, diethylene glycol diethyl ether, triethylene glycol dimethyl ether, triethylene glycol diethyl ether and 1,3-dioxolane. More preferably, the ether-based solvent may be at least one selected from the group consisting of ethylene glycol dimethyl ether, diethylene glycol dimethyl ether and 1,3-dioxolane.

The electrolyte solution may be formed by dissolving a lithium salt together with the ether-based solvent. Herein, the lithium salt functions as a supply source of lithium ions in the battery enabling basic operation of a lithium secondary battery.

The lithium salt is not limited as long as it is commonly used in an electrolyte liquid for a lithium secondary battery. Examples thereof may include LiCl, LiBr, LiFSI, LiI, LiClO$_4$, LiAlO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, (C$_2$F$_5$SO$_2$)$_2$NLi, LiC$_4$F$_9$SO$_3$, chloroborane lithium, lower aliphatic carboxylic acid lithium, lithium tetraphenylborate and the like.

The concentration of the lithium salt may be from 0.2 M to 2 M, specifically from 0.6 M to 2 M and more specifically from 0.7 M to 1.7 M depending on various factors such as an accurate composition of the electrolyte solvent mixture, solubility of the salt, conductivity of the dissolved salt, charge and discharge conditions of a battery, a working temperature, and other factors known in the lithium battery field. When the lithium salt concentration is less than 0.2 M, conductivity of the electrolyte may decrease causing decline in the battery performance, and when the lithium salt concentration is greater than 2 M, viscosity of the electrolyte increases leading to a decrease in the lithium ion mobility.

With the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the lithium salt-containing electrolyte liquid. In some cases, halogen-containing solvents such as carbon tetrachloride and trifluoroethylene may be further included in order to provide nonflammability, carbon dioxide gas may be further included in order to enhance high temperature storage properties, and fluoro-ethylene carbonate (FEC), propene sultone (PRS) and the like may be further included. In addition, additives such as vinylene carbonate (VC) and vinyl ethylene carbonate may be further added in order to enhance battery cycle properties and high temperature safety.

The gel polymer electrolyte is prepared by impregnating an electrolyte solution having the composition as above into a polymer matrix, and curing the result.

The polymer matrix needs to have inner space into which the electrolyte solution may be impregnated, and needs to maintain mechanical strength and be not dissolved in the electrolyte solution even when the electrolyte solution is impregnated inside. In addition, the polymer matrix needs to have strong binding strength with the separator (40) and the negative electrode (10) while having excellent lithium ion dissociation ability, and for this, needs to have hydrophobicity or affinity with materials forming the separator (40) and the negative electrode (10).

The polymer matrix may comprise at least one selected from the group consisting of polyethylene oxide, polypropylene oxide, polyacrylonitrile, polyvinyl chloride, polyvinylidene fluoride, polymethyl methacrylate, poly(meth) acrylate, polysiloxane and polyphosphazene.

The gel polymer electrolyte (31) is prepared by impregnating the electrolyte solution comprising the ether-based solvent and the lithium salt into the polymer matrix, and then gelling the result through irradiating heat or light, and herein, a pyrolytic initiator or a photolytic initiator may be further added in order to facilitate gelation by heat or light.

Specific examples of the pyrolytic initiator may include peroxide initiators, ester-based initiators, azo-based initiators or the like, and as the photolytic initiator, commonly used photolytic initiators may be used. Herein, the pyrolytic initiator or the photolytic initiator is added in 0.5 parts by weight to 7 parts by weight with respect to 100 parts by weight of the polymer matrix.

The liquid electrolyte (32) is included between the positive electrode (20) and the separator (40), and comprises a carbonate-based solvent and a lithium salt.

In the present invention, high voltage stability may be secured by using the liquid electrolyte comprising a carbonate-based solvent between the positive electrode (20) and the separator (40).

The carbonate-based solvent may comprise at least one selected from the group consisting of ethylene carbonate, propylene carbonate, 1,2-butylene carbonate, 2,3-butylene carbonate, 2,3-pentylene carbonate, dimethyl carbonate, diethyl carbonate, ethylmethyl carbonate, dipropyl carbonate, methylpropyl carbonate and ethylpropyl carbonate. Preferably, the carbonate-based solvent may be at least one selected from the group consisting of ethylene carbonate, propylene carbonate, dimethyl carbonate, diethyl carbonate and dipropyl carbonate. More preferably, the carbonate-based solvent may be at least one selected from the group consisting of ethylene carbonate, dimethyl carbonate and diethyl carbonate.

The lithium salt is the same as described in the gel polymer electrolyte (31).

Accordingly, the present invention provides a lithium secondary battery comprising a positive electrode, a negative electrode, and a separator, a gel polymer electrolyte and a liquid electrolyte interposed therebetween, wherein the gel polymer electrolyte comprises an ether-based solvent and the liquid electrolyte comprises a carbonate-based solvent.

As described above, the lithium secondary battery (100) according to one embodiment of the present invention includes a gel polymer electrolyte (31) between a negative electrode (10) and a separator (40), and includes a liquid electrolyte (32) between a positive electrode (20) and the separator (40). Herein, the gel polymer electrolyte (31) comprises an ether-based solvent and the liquid electrolyte (32) comprises a carbonate-based solvent. Using the ether-based solvent in the negative electrode (10) may increase reaction efficiency with lithium metal, a negative electrode active material, and using an electrolyte in a gel-type polymer state minimizes a direct reaction with an electrolyte solution and prevents metal ions eluted from the positive electrode from migrating to the negative electrode, or reducing metal precipitation in the negative electrode, and as a result, stability of the lithium metal electrode may be improved. In addition, using the carbonate-based solvent in the positive electrode (20) may secure high voltage stability and resolve a problem of internal resistance increase and by the reaction area between the electrolyte liquid in a liquid state and the positive electrode active material becoming uniform and widening, an effective electrochemical reaction may be obtained. As a result, charge and discharge efficiency and life time of a lithium secondary battery may be enhanced, and an excellent battery capacity property is obtained even when charged with a high voltage as well as a general voltage.

A method for manufacturing a lithium secondary battery having the constitutions described above is not particularly limited, and known methods may be used.

In addition, the shape of the lithium secondary battery of the present invention is not particularly limited, and various shapes such as a cylinder-type, a lamination-type or a coin-type capable of operating as a battery may be employed.

In addition, the present invention provides a battery module including the lithium secondary battery as a unit cell, and provides a battery pack including the battery module.

The battery pack may be used as a power supply of medium to large-sized devices requiring high temperature stability, long cycle and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including e-bikes, e-scooters and the like; electric golf carts; systems for power storage and the like, but are not limited thereto.

MODE FOR INVENTION

Hereinafter, preferred examples will be provided in order to illuminate the present invention, however, the following examples are for illustrative purposes only, and it will be obvious to those skilled in the art that various changes and modifications may be made within the scope and technological ideas of the present invention, and such changes and modifications also belong to the scope of the attached claims.

Preparation Example: Manufacture of Li/Li Symmetric Cell

Preparation Example 1

A lithium metal thin film having a thickness of 20 μm was used as a negative electrode. An electrolyte was prepared by dissolving 1 M concentration of lithium bisfluorosulfonyl imide (LiFSI) in an organic solvent formed with 1,3-dioxolane and ethylene glycol dimethyl ether (DOL:DME=1:1 (volume ratio)).
A Li/Li symmetric cell was manufactured using the negative electrode and the electrolyte liquid.

Preparation Example 2

A Li/Li symmetric cell was manufactured in the same manner as in Preparation Example 1 except that the electrolyte was prepared by dissolving 1 M concentration of lithium hexafluorophosphate (LiPF$_6$) in an organic solvent formed with ethylene carbonate, diethyl carbonate and dimethyl carbonate (EC:DEC:DMC=1:2:1 (volume ratio), and adding 2% by weight of VC.

EXAMPLE AND COMPARATIVE EXAMPLE

Example 1

After preparing positive electrode active material slurry formed with LiCoO$_2$ as a positive electrode active material, Super P as a conductive material and polyvinylidene fluoride (PVDF) as a binder in 95% by weight, 2.5% by weight and 2.5% by weight, respectively, the positive electrode active material slurry was coated on an aluminum current collector, and then the result was dried to prepare a positive electrode.
A lithium metal thin film having a thickness of 20 μm was used as a negative electrode.
After impregnating 100 μl of an electrolyte solution obtained by dissolving 1 M concentration of lithium bisfluorosulfonyl imide (LiFSI) in an organic solvent formed with dioxolane and ethylene glycol dimethyl ether (DOL:DME=1:1 (volume ratio)) into a polymer matrix formed with ethoxylated trimethylolpropane triacrylate (ETPTA) formed on the surface of the negative electrode, the result was cured to form a gel polymer electrolyte on the negative electrode surface.
After placing the gel polymer electrolyte-formed negative electrode and the positive electrode to face each other, ionically conductive glass-ceramic (manufactured by Ohara Corporation, Japan) was interposed between the positive electrode and the negative electrode as a separator to prepare an electrode assembly.
After inserting the electrode assembly into a coin cell, an liquid electrolyte obtained by dissolving 1 M concentration of lithium hexafluorophosphate (LiPF$_6$) in an organic solvent formed with dimethyl carbonate (EC:DEC:DMC=1:2:1 (volume ratio)) and adding 2% by weight of VC was injected between the positive electrode and the separator, and the result was completely sealed to manufacture a lithium secondary battery.

Comparative Example 1

After inserting an electrode assembly having an ionically conductive glass-ceramic separator provided between a positive electrode and a negative electrode into a coin cell in the same manner as in Example 1, 100 μl of an liquid electrolyte obtained by dissolving 1 M concentration of lithium bisfluorosulfonyl imide (LiFSI) in an organic solvent formed with ethylene glycol dimethyl ether (DOL:DME=1:1 (volume ratio)) was injected thereto. After that, the result was completely sealed to manufacture a lithium secondary battery.

Comparative Example 2

After inserting an electrode assembly having an ionically conductive glass-ceramic separator provided between a positive electrode and a negative electrode into a coin cell in the same manner as in Example 1, 100 μl of an liquid electrolyte obtained by dissolving 1 M concentration of lithium hexafluorophosphate (LiPF$_6$) in an organic solvent formed with dimethyl carbonate (EC:DEC:DMC=1:2:1 (volume ratio)) and adding 2% by weight of VC was injected thereto. After that, the result was completely sealed to manufacture a lithium secondary battery.

Experimental Example 1. Performance Evaluation on Symmetric Cell

The symmetric cells manufactured in Preparation Examples 1 and 2 were charged and discharged under a charge and discharge condition of 83% depth of discharge (DOD), and 1 C. After the charge and discharge, cycle efficiency (%) was measured, and the results are shown in the following Table 1.

TABLE 1

|  | Li Cycle Efficiency (%) |
| --- | --- |
| Preparation Example 1 | 99.42 |
| Preparation Example 2 | 94.64 |

When referring to Table 1, it was identified that, when a negative electrode is lithium metal, Li efficiency increased when including an ether-based solvent as in Preparation Example 1 compared to Preparation Example 2 using a carbonate-based solvent.

Experimental Example 2. Performance Evaluation on Lithium Secondary Battery

Figure 2:
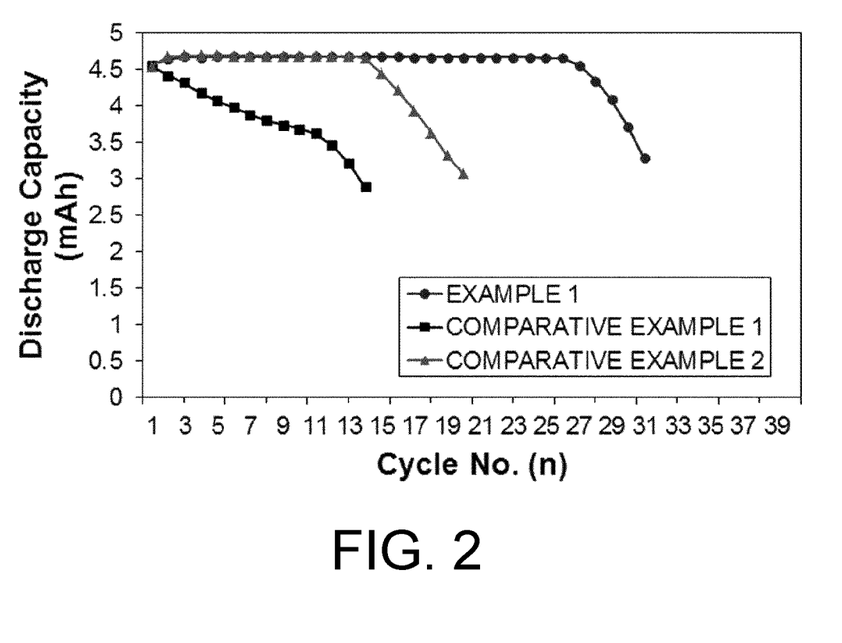
FIG. 2 is a graph showing a capacity property of lithium secondary batteries manufactured in examples and comparative examples of the present invention.

Each of the lithium secondary batteries (battery capacity 4.6 mAh) manufactured in the example and the comparative examples was charged to 4.6 V with a constant current of 0.7 C at 55° C., then charged with a constant voltage of 4.6 V, and the charge was terminated when the charge current became 0.275 mA. After that, the battery was left unattended for 10 minutes and discharged to 3.0 V with a constant current of 0.5 C. Battery capacity was measured after performing the charge and discharge for 50 cycles, and the results are shown in FIG. 2.
When referring to FIG. 2, it was identified that the lithium secondary battery of Example 1 had no capacity changes up to 25 cycles even at a high voltage. In comparison, capacity rapidly decreased in Comparative Example 1 as soon as the charge and discharge started, and in Comparative Example 2, capacity rapidly decreased after 13 cycles. Accordingly, it was identified that the lithium secondary battery of the present invention exhibited an excellent capacity property even in a high voltage range.

REFERENCE NUMERAL

100: Lithium Secondary Battery
10: Negative Electrode
20: Positive Electrode
30: Electrolyte
31: Gel Polymer Electrolyte
32: Liquid Electrolyte
40: Separator

INDUSTRIAL APPLICABILITY

A lithium secondary battery according to the present invention separately includes a most efficient electrolyte in each of a negative electrode and a positive electrode, and as a result, battery performance and life time are improved enabling the lithium secondary battery to have high capacity, high stability and long life time.

The invention claimed is:
1. A lithium secondary battery comprising:
a positive electrode;
a negative electrode, wherein the negative electrode comprises a lithium metal or a lithium alloy; and
a separator and an electrolyte interposed between the positive electrode and the negative electrode,
wherein the separator has a first surface and a second surface,
wherein the electrolyte comprises a gel polymer electrolyte and a liquid electrolyte,
wherein the gel polymer electrolyte is included between the negative electrode and the first surface of the separator,
wherein the gel polymer electrolyte comprises a polymer matrix impregnated with an electrolyte solution consisting of an ether-based solvent, a lithium salt, and an additive,
wherein the gel polymer electrolyte is present on the negative electrode;
wherein the liquid electrolyte is included between the positive electrode and the second surface of the separator, and
wherein the liquid electrolyte consists of a carbonate-based solvent, a lithium salt, and an additive.

2. The lithium secondary battery of claim 1, wherein the ether-based solvent comprises at least one selected from the group consisting of dimethyl ether, diethyl ether, dibutyl ether, ethylene glycol dimethyl ether, diethylene glycol dimethyl ether, diethylene glycol diethyl ether, triethylene glycol dimethyl ether, triethylene glycol diethyl ether, 1,3-dioxolane, 4-methyldioxolane, 1,4-dioxane, 3,5-dimethyl isoxazole, 2,5-dimethylfuran, furan, 2-methylfuran, tetrahydrofuran and 2-methyltetrahydrofuran.

3. The lithium secondary battery of claim 1, wherein the polymer matrix comprises at least one selected from the group consisting of polyethylene oxide, polypropylene oxide, polyacrylonitrile, polyvinyl chloride, polyvinylidene fluoride, polymethyl methacrylate, poly(meth)acrylate, polysiloxane and polyphosphazene.

4. The lithium secondary battery of claim 1, wherein the carbonate-based solvent comprises at least one selected from the group consisting of ethylene carbonate, propylene carbonate, 1,2-butylene carbonate, 2,3-butylene carbonate, 2,3-pentylene carbonate, dimethyl carbonate, diethyl carbonate, ethylmethyl carbonate, dipropyl carbonate, methylpropyl carbonate and ethylpropyl carbonate.

5. The lithium secondary battery of claim 1, wherein the additive in the gel polymer electrolyte and the liquid electrolyte is independently selected from the group consisting of vinylene carbonate and vinyl ethylene carbonate.

6. The lithium secondary battery of claim 1, wherein the lithium salt in the gel polymer electrolyte and the liquid electrolyte is independently selected from the group consisting of LiCl, LiBr, LiFSI, LiI, LiClO$_4$, LiAlO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, (C$_2$F$_5$SO$_2$)$_2$NLi, LiC$_4$F$_9$SO$_3$, chloroborane lithium, lower aliphatic carboxylic acid lithium, and lithium tetraphenylborate.

7. The lithium secondary battery of claim 6, wherein the lithium salt is selected from the group consisting of lithium hexafluorophosphate (LiPF$_6$) and lithium bisfluorosulfonyl imide (LiFSI).

8. The lithium secondary battery of claim 6, wherein the lithium salt in the liquid electrolyte is present in a concentration from 0.2 M to 2 M.

9. The lithium secondary battery of claim 6, wherein the lithium salt in the liquid electrolyte is present in a concentration from 0.6 M to 2 M.

10. The lithium secondary battery of claim 6, wherein the lithium salt in the liquid electrolyte is present in a concentration from 0.7 M to 1.7 M.

11. The lithium secondary battery of claim 1, wherein the carbonate-based solvent is selected from the group consisting of ethylene carbonate, diethyl carbonate and dimethyl carbonate.

12. The lithium secondary battery of claim 11, wherein the solvent comprises ethylene carbonate, diethyl carbonate and dimethyl carbonate, which are present in a 1:2:1 volume ratio.

13. The lithium secondary battery of claim 1, wherein the ether-based solvent is selected from the group consisting of ethylene glycol dimethyl ether, diethylene glycol dimethyl ether and 1,3-dioxolane.

14. A lithium secondary battery comprising:
a positive electrode;
a negative electrode;
a separator and an electrolyte interposed between the positive electrode and the negative electrode;
wherein the separator has a first surface and a second surface,
wherein the electrolyte comprises a gel polymer electrolyte and a liquid electrolyte,
wherein the gel polymer electrolyte is interposed between the negative electrode and the first surface of the separator;
wherein the liquid electrolyte is interposed between the positive electrode and the second surface of the separator;
wherein the gel polymer electrolyte comprises a polymer matrix impregnated with a solution consisting of (i) an ether-based solvent, (ii) a lithium salt, and (iii) an additive selected from the group consisting of vinylene carbonate and vinyl ethylene carbonate;
wherein the gel polymer electrolyte is present on the negative electrode;
wherein the liquid electrolyte consists of (i) a carbonate-based solvent, (ii) a lithium salt, and (iii) an additive selected from the group consisting of vinylene carbonate and vinyl ethylene carbonate; and wherein the liquid electrolyte is present on the positive electrode.

15. The lithium secondary battery of claim 14, wherein the ether-based solvent is selected from the group consisting of ethylene glycol dimethyl ether, diethylene glycol dimethyl ether and 1,3-dioxolane.

16. The lithium secondary battery of claim 14, wherein the carbonate-based solvent is selected from the group consisting of ethylene carbonate, diethyl carbonate and dimethyl carbonate.

17. The lithium secondary battery of claim 14, wherein the lithium salt in the liquid electrolyte is selected from the group consisting of lithium hexafluorophosphate ($LiPF_6$) and lithium bisfluorosulfonyl imide (LiFSI).

* * * * *